United States Patent [11] 3,625,765

| [72] | Inventors | Frank C. Arrance<br>Costa Mesa;<br>Albert G. Rosa, Placentia, both of Calif. |
|---|---|---|
| [21] | Appl. No. | 843,610 |
| [22] | Filed | July 22, 1969 |
| [45] | Patented | Dec. 7, 1971 |
| [73] | Assignee | McDonnell Douglas Corporation<br>Santa Monica, Calif. |

[54] PRODUCTION OF BATTERY ELECTRODE
8 Claims, 7 Drawing Figs.

[52] U.S. Cl. .................................................. 136/75,
  136/20, 136/24, 136/120, 136/68
[51] Int. Cl. ..................................................... Holm 35/06
[50] Field of Search ............................................. 136/20, 23,
  24, 25, 28, 30, 6, 83, 116, 120, 68, 75; 75/200,
  201, 206; 29/182.5; 264/59, 126

[56] References Cited
UNITED STATES PATENTS

| 1,356,435 | 10/1920 | Engle | 136/116 |
|---|---|---|---|
| 3,266,893 | 8/1966 | Duddy | 136/120 R |
| 3,287,166 | 11/1966 | Arrance | 136/68 |
| 3,290,124 | 12/1966 | Holtzclaw, Jr. | 136/120 |
| 3,321,286 | 5/1967 | Clark et al. | 29/182.5 |
| 3,395,049 | 7/1968 | Thompson | 136/120 FC |

*Primary Examiner*—Winston A. Douglas
*Assistant Examiner*—C. F. Lefevour
*Attorney*—Max Geldin ABSTRACT: Production of a sintered metal matrix which is uniform, and maintains its shape without collapse or distortion, for use particularly as an electrode matrix for a high-rate, high-energy density battery, by a process which comprises, according to one embodiment, dipping a spongelike material such as a polyurethane sponge in a slurry of a plastic binder which decomposes at a higher temperature than the spongelike material, such as polyphenylene oxide, dissolved in a solvent such as chloroform, and containing a sinterable metallic constituent such as a mixture of silver and silver oxide, air-drying the resulting coated spongelike material, heating the dried and coated spongelike material to a temperature causing decomposition of the spongelike material, leaving a matrix of the plastic binder and sinterable metallic constituent, further heating at a higher temperature the latter remaining matrix, causing a partial sintering of the metallic constituent followed by decomposition of the plastic binder, the partially sintered metallic matrix being sufficiently well formed to avoid slumping or distortion of the matrix, and further heating and sintering the remaining matrix to provide a strong porous matrix. The porous matrix itself can be used as an electrode, or the pores of the matrix can be filled with active battery electrode material such as zinc, by suitable means as by application of pressure, to form a high-strength high-capacity electrode for a high-rate high-energy density battery.

INVENTORS
FRANK C. ARRANCE
ALBERT G. ROSA
BY Max Gelden
ATTORNEY

PRODUCTION OF BATTERY ELECTRODE

This invention relates to production of high-strength battery electrodes, such as zinc electrodes, particularly adapted for high energy density batteries, and is especially concerned with the provision of improved porous matrices for use in producing such electrodes, novel procedure for fabricating such matrices, and to improved electrode structures and battery construction embodying such electrodes.

Batteries are an important source of energy storage for power generation in airborne systems. An important type of battery particularly suited for such applications are the high energy density alkaline electrolyte cells using such electrode combinations as silver-zinc, silver-cadmium, nickel-cadmium, and nickel-zinc. High energy density batteries are generally battery system which have a substantially higher energy per unit of weight than conventional, e.g., lead storage batteries. Such high energy density batteries have many application such as in portable tools and appliances, television, radio and record players, engine starting, portable X-ray units and the like.

In high energy density batteries such as silver-zinc, nickel-cadmium, silver-cadmium, and nickel-zinc, the electrodes are placed adjacent opposite sides of a membrane or separator which performs the function of retaining electrolyte, e.g., potassium hydroxide, separating the electrodes, and preventing migration of electrode ions which short circuit the battery.

In U.S. Pat. No. 3,287,166 there is described a process for producing a porous matrix for use in production of battery electrodes which comprises treating a spongelike organic material such as polystyrene, with a slurry containing a conductive inorganic material including a metallic constituent, e.g., silver, drying the resulting sponge to remove liquid vehicle, heating the dried sponge containing the metallic constituent to a temperature in the range from about 125° to about 350° C. to decompose or pyrolyze the spongelike material, and further heating at higher temperature to cause sintering of the metallic constituent such as silver to form a sintered porous matrix of such constituent, e.g., a sintered silver matrix which can serve as an electrode structure per se, or be further treated to incorporate active electrode material into the pores of the matrix to form the desired electrode.

Although the procedure and electrode structures produced as described in the above patent have been found generally successful for producing electrodes of high capacity when incorporated in a high energy density battery, it has been found that distortion and sagging nonuniformity of structure often occurs in the metallic matrix produced according to the above patent. The reason for this undesirable phenomenon is that at the temperature of decomposition of the spongelike material, that is at temperature of the order of about 250° to about 350° C., the remaining matrix containing the sinterable metallic constituent, has not been sufficiently well formed and is not sufficiently strong to maintain its shape without some collapse or distortion occuring, so that upon further heating and sintering of such matrix, the resulting sintered matrix embodies the same qualities of nonuniformity, and attendant distortion and slumping. The result is an electrode structure which, for example, after filling of the pores with active electrode material such as zinc oxide, is nonuniform and has reduced electrical efficiency and reduced life, when incorporated and employed in a high energy density battery.

It has now been found according to the present invention, that by incorporating a high-temperature plastic binder, that is a plastic binder which decomposes at a temperature higher than the decomposition temperature of the spongelike material into the slurry containing the sinterable metallic constituent, and treating or coating the spongelike material with such slurry, upon heating the organic spongelike form at temperature at which such spongelike material is destroyed by oxidation, the remaining structure or matrix does not deform because of the remaining presence of the high-temperature plastic binder, which holds the structure in place and integral until the metallic constituent, e.g., silver, is well formed. Upon further heating of such matrix at a higher temperature, the high-temperature plastic binder commences to oxidize and deteriorate and when this occurs, the resulting at least partially sintered metal matrix is well formed and maintains its shape without collapse upon further heating of such matrix at higher temperatures to cause final sintering of the metal matrix.

Briefly, there is thus provided according to the invention, a process which comprises contacting a spongelike organic material with a slurry containing a conductive sinterable inorganic material including a metallic constituent, and a plastic binder which decomposes at a temperature higher that said spongelike material, said plastic binder being dissolved in a solvent, heating the so-treated spongelike material to a temperature causing decomposition and removal of said spongelike material and removing same and further heating the remaining matrix formed of said plastic and inorganic material at a higher temperature, causing sintering of said sinterable inorganic material and decomposition and removal of said plastic binder. In preferred practice, the remaining sintered inorganic matrix is further heated at a still higher temperature until the desired degree of sintering is accomplished, to provide a strong porous matrix of said inorganic material.

As previously noted, the plastic binder is substantially stable, just prior to and during the initial sintering of the inorganic material and supporting the sinterable inorganic material, the resulting initially sintered inorganic matrix being substantially self-supporting when the plastic binder is decomposed and removed, the further heated and finally sintered matrix thus being uniform and substantially free from slumping.

The resulting porous matrix, where composed of a suitable active material such as sliver, can be employed per se as a porous battery electrode, but preferably the resulting high-strength uniform porous matrix is filled or impregnated with active electrode material so that the metal matrix serves as an efficient highly conductive strong nonslumping and non-sagging support for the active electrode material.

When incorporating in a high energy density battery such as a silver-zinc, silver-cadmium, nickel-cadmium or nickel-zinc system, the improved electrode of the invention provides a high-rate, high-capacity battery having efficient electrical performance over an extended period of operation, that is over a large number of charge-discharge cycles.

The invention will be further described in relation to the accompanying drawing wherein.

The drawings are exaggerated for greater clarity

Figure 1:
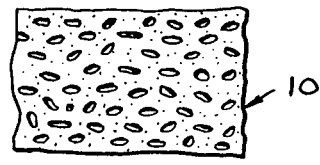
FIG. 1 illustrates an organic spongelike material employed in the invention process.

Referring to FIG. 1 of the drawing an organic spongelike material indicated at 10, is first cut to the desired shape. The sponge employed can be any organic material which will decompose on heating, e.g. by pyrolysis, or which will sublime on heating. Thus, the term "decompose" is intended to include any process by which the organic material is completely destroyed or removed on heating. Any organic spongelike material can be employed according to the invention, which can be distilled, burned, vaporized or pyrolized at temperatures in the range of about 125° C. to about 350° C. to effect its removal. The spongelike materials usually employed are the type which pyrolyze. Examples of organic sponges which can be employed in the invention process include natural sponges and synthetic sponges such as polystyrene, polyurethane, natural sponge, neoprene, natural rubber, cellulose, and the like. Particularly suitable sponges for purposes of the invention are polyurethane and polystyrene sponges. The sponges employed according to the invention are preferably relatively flexible but may, if desired, be relatively rigid.

It has been found that pretreatment of the spongelike material or organic matrix 10 in a solvent such as chloroform, trichloroethylene, or the like, causes the sponge to swell, resulting in enlargement of the cell structure of the sponge, and permitting a more uniform coating of the plastic binder and metallic powder mixture to be formed on the sponge in a subsequent step, and minimizes agglomeration of the deposited materials (plastic binder and metal). Such pretreatment as by dipping may be repeated as required several times, say three, four or five times. It will be understood however, that although such pretreatment of the spongelike material in a solvent is preferred, this step can be omitted, since the spongelike material will also swell when treated in the metal constituent-plastic binder slurry with which the sponge is subsequently treated, as described below.

The organic sponge or spongelike material, preferably initially treated with solvent to expand same as noted above, is then treated as by dipping, with a slurry or mixture of a solvent solution of high-temperature plastic binder containing the desired conductive metal constituent or metal in suspension therein. As to high-temperature plastic binders which can be employed, any material of this type which can be decomposed or pyrolyzed at temperatures higher, preferably substantially higher, than the decomposition or pyrolysis temperature of the spongelike material utilized, can be employed. Preferably, high-temperature plastics which are stable at temperatures ranging from about 300° to about 400° C., and which decompose at temperatures above 400° C. e.g., ranging from about 400° to about 600° C., are employed. Suitable high-temperature plastic binders of this type include polyphenylene oxide, also referred to herein as "PPO," polysulfone, hereinafter also referred to as "PS," acrylate polymers such as methylmethacrylate polymers, butadiene-styrene polymers, and the like.

The inorganic material, or metallic constituent or metal present in the slurry is a sinterable inorganic or metallic constituent or metal, and can be a conductive metal of an active electrode material. Suitable sinterable metals which can be employed include silver, copper, gold, nickel, iron, and the like. Metals such as cadmium and zinc, which are active electrode materials can also be employed, particularly where the porous sintered matrix produced according to the invention process is itself to be employed as an electrode. It will be understood that compounds of such metals such as the oxides can be employed in place of the metal per se, or mixtures of the oxides and the metallic constituent, e.g., a mixture of silver and silver oxide can be employed, as well as alloys of such metals such as bronze. Thus, it is intended that the above-listed metals include the metals per se and also when present as a metallic constituent in compounds or alloys thereof.

The solvent in which the high-temperature plastic binder such as PRO is dissolved, can be any suitable preferably rapidly drying solvent such as those noted above for pretreating and swelling the spongelike material, including chloroform, trichloroethylene, carbon tetrachloride and the like, which although effective for expanding the spongelike material, will not cause dissolution or disintegration thereof.

The above-noted slurry of high-temperature plastic binder such as PPO, dissolved in a solvent, with the sinterable metallic constituent suspended therein, can be relatively dilute or relatively concentrated, and can contain about 90 to about 10 percent solvent such as chloroform, and about 10 to about 90 percent solids (high-temperature plastic binder plus metallic constituent), by weight. The ratio of metallic constituent such as silver, e.g., in the form of a mixture of silver oxide and silver, and plastic binder such as PPO, in the slurry can range from about 2 to about 50 percent plastic binder, e.g., PPO, and from about 50 to about 98 percent inorganic material or sinterable metallic constituent such as silver oxide-silver powder, by weight. It is preferred to employ a major proportion of the inorganic or metallic constituent and a minor portion of the plastic binder such as PPO, e.g., about 2 to about 25 percent plastic binder and about 75 to about 98 percent sinterable metallic constituent.

Upon treatment or dipping of the spongelike material into the above-noted slurry, the swelling of the sponge permits the slurry to be evenly distributed and coated over all of the exposed surfaces of the sponge, and to impregnate the exposed and expanded pores of the sponge. Upon removal of the treated or coated spongelike material from the slurry, any excess buildups or "blobs" on the exposed surfaces of the sponge are readily controlled by vibrating off such excess deposits or by employing a fine air stream to remove excess coated mineral.

Following removal of the sponge from the solvent solution of high-temperature plastic binder and suspended metallic constituent, the swelled or expanded sponge is dried in air, e.g., at ambient temperature of preferably at elevated temperatures ranging from about 100° to about 200° F. Such drying can take place for a period from as little as about 15 seconds up to about 24 hours at ambient temperature. When heated air is employed at temperatures of about 100° to about 200° F., the drying can be carried out in a matter of minutes or less.

The above-noted dipping and drying operations to which the spongelike material is subjected can be carried out a single time, or can be repeated several times, e.g., three times, in order to obtain the required thickness of metallic constituent-plastic binder coating on the spongelike material or matrix. Employing the plastic binder-metal slurry system according to the invention, results in uniform thickness of coated material upon the sponge and the honeycomb cells formed within the sponge structure, and undesirable buildup of plastic-metal slurry is avoided by preferably rapid evaporation of the solvent.

The dried coated sponge is then subjected to a gradual increase in temperature as by placing the coated sponge in a furnace, and the temperature gradually raised to a temperature between about 200° and about 400° C. to cause decomposition and removal of the spongelike material. Thus, for example in the case of a polyurethane or polystyrene sponge, a gradual increase in temperature is effected over a period of say 3 to 4 hours preferably in a highly oxidizing atmosphere, until a temperature of between 300+ and 350° C. is reached, at which temperature the organic sponge form or matrix is destroyed or decomposed by oxidation or pyrolysis of the sponge. However, the structure of the remaining matrix of plastic binder, e.g., PPO, and sinterable metal, e.g., silver-silver oxide, is not deformed or distorted due to slumping or collapse, as the sponge matrix is burned out, because the high-temperature plastic binder maintains the matrix structure integral.

The temperature of the remaining metal-plastic binder matrix is then further raised gradually to a temperature above 400° C. and in the range of about 400° to about 600° C. Over the temperature range of about 300° to about 450° C. Over the temperature range of about 300° to about 450° C., the plastic binder continues to maintain the matrix relatively rigid. During this period initial sintering of the sinterable metal, e.g., silver-silver oxide, takes place, building up the strength of the metal matrix. In the temperature range from about 450° to about 600° C., during which sintering of the metal constituent progresses further, the high-temperature plastic binder, e.g., PPO, starts to oxidize and is destroyed. At this point, the sintered metal matrix is well formed and maintains its shape without collapse or distortion. If desired, heating can be discontinued at this point, and the sintered metal matrix can be cooled, resulting in production of a high-strength porous matrix according to the invention. However, to obtain a metal matrix having particularly high-strength and best performance characteristics when employed as an electrode matrix, in preferred practice heating of the initially sintered metal matrix following removal of the plastic binder is continued at increased temperature up to the range of about 750° to about 950° C., particularly in the case of silver, e.g., over a period of about 3 to 4 hours, to obtain the final sintered electrode matrix. When metal oxides such as silver oxide are present, forming all or a part of the inorganic constituent, reduction of the oxide to the metal, e.g.. silver, usually occurs during the sintering.

Overall time of heating for destruction or pyrolysis of the sponge, followed at higher temperature by destruction of the high-temperature plastic binder, can range from as little as 3 hours up to about 16 hours. However, it is preferred not to heat the coated sponge too rapidly, that is to raise the temperature to the decomposition temperature of the sponge and then to the decomposition temperature of the plastic binder too rapidly, since such procedure would undesirably result in the formation of cracks in the final sintered, e.g., silver, matrix.

After the matrix has been heated to its maximum temperature, e.g., of the order of about 750° to about 950° C. to effect final sintering of the remaining metal matrix, the matrix is permitted to cool over a period, e.g., which can range from about 1 to about 30 hours, down to ambient temperature to obtain a strong matrix of good uniformity with respect to shape, appearance, and pore size.

Figure 2:
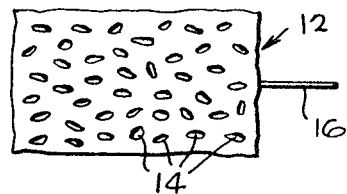
FIG. 2 illustrates a porous metal matrix or electrode structure produced according to the invention process.

The resulting cooled sintered metal matrix, as indicated at 12, in FIG. 2 has a multiplicity of pores 14 of relatively uniform size. If desired, an electrode contact wire such as silver wire can be sintered in place by inserting the wire into the dried sponge before heating the sponge and plastic binder to decompose these organic materials and to sinter the inorganic or metal content of the sponge. Such lead wire 16 alternatively can be attached to the sintered matrix 12 by soldering, spot welding and the like. The size of pores 14 formed in the metal matrix 12 according to the invention process can range, for example, from about 0.01 to about 0.50 inch in diameter, depending upon the pore size of the initial spongelike material employed. The web or wall thickness of the metal matrix between adjacent pores is sufficient to provide a metal matrix of high strength as previously noted.

Figure 3:
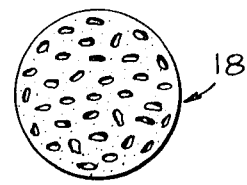
FIG. 3 shows a circular-type porous matrix or electrode structure produced according to the invention.

A circular conductive metal matrix produced according to the invention process is indicated at 18 in FIG. 3.

Thus, for example, a porous metal matrix composed of a metal such as nickel, copper, silver, gold or alloys thereof can first be formed according to the invention procedure, followed by filling or impregnation of the pores of the matrix with active electrode material. The resulting sintered metal matrix, such as a silver or a nickel matrix can then have the pores thereof filled or impregnated with, e.g., a zinc-zinc oxide paste or a silver-silver oxide powder, by vibrating such paste or powder into the pores of the matrix, or by forcing the paste or powder as by application of pressure into the pores of the matrix. If desired, such unit can be further sintered to form a highly uniform high-strength high-capacity electrode. Electrodes of this type formed of a metal matrix containing active electrode material are illustrated in FIG. 4, wherein numeral 20 illustrates such an electrode composed of a metal matrix 22 such as silver, the pores 23 of which are filled with an active electrode material 25 such as silver or zinc.

Figure 5:
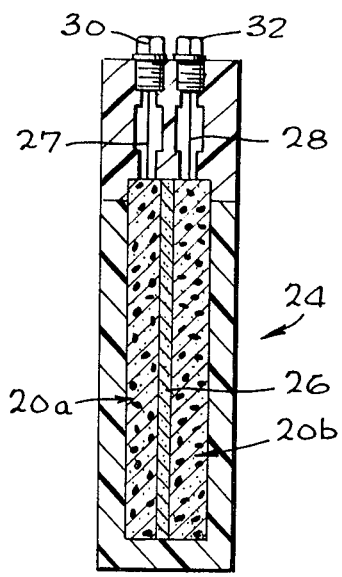
FIG. 5 illustrates assembly of a pair of electrodes of the type illustrated in FIG. 4 in a high energy density battery.
Figure 4:
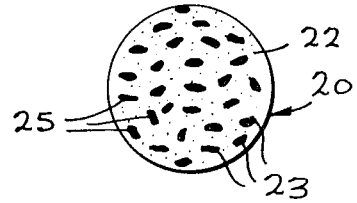
FIG. 4 illustrates a metal matrix produced according to the invention process, the pores which are filled with active electrode material to form an electrode.

Referring now to FIG. 5, this illustrates assembly of electrodes of the type indicated at 20 in FIG. 4 produced according to the invention, to form a battery employing a plastic case 24 containing therein zinc and silver electrodes 20a and 20b, respectively, each corresponding to the electrode structure 20 of FIG. 4, formed of a matrix such as silver, having the pores thereof impregnated with zinc and silver, respectively. A separator 26, which can be either an organic separator or an inorganic separator, of any suitable type such as those described below, preferably an inorganic separator, is disposed between the electrodes 20a band 20b. Connector wires 27 and 28 are connected respectively to the electrodes 20a and 20b, and such wires connected to terminals 30 and 32 respectively mounted on the top of the battery. If desired, only one of the electrodes 20a and 20b can be an electrode according to the invention, the other being a conventional, e.g., silver or zinc, electrode.

The separator 26 can be of inorganic or organic materials. Inorganic separator materials which can be used include a variety of porous inorganic or ceramic substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. A preferred separator of this type is hydrous zirconium oxide or zirconia.

Other porous inorganic materials which can be employed for producing the separator for use in the battery according to the invention include sintered aluminosilicates, especially the alkali metal and alkaline earth metal aluminosilicates, because of their formation of a hard ceramic material upon sintering, while still retaining suitable porous characteristics. The aluminosilicates of suitable porous internal structure are particularly preferred in this respect. Examples include nonfluxed aluminosilicate, fluxed aluminosilicates or salts thereof, such as sodium and potassium aluminosilicates, e.g. magnesium aluminosilicate (Cordierite). These materials can be used separately, but often mixtures of the aluminosilicates are used, e.g., complex mixtures of both the alkali metal and the alkaline earth metal aluminosilicates. Such aluminosilicate separator materials are described in the Berger U.S. Pat. No. 3,379,570.

Another useful class of inorganic separator materials are the naturally occuring clay minerals of the kaolinite group. This is a group of naturally occuring clays containing aluminum oxide and silica, usually together with bound water, and having the formula $Al_2O_3 \cdot 2SiO_2 \cdot H_2O$. In addition to kaolinite, other useful members of this group include mineral clays halloysite, dickite, nacrite and anauxite.

Other types of inorganic separator materials which can be employed include those in the form of a sintered porous solid solution of magnesium silicate and a member selected from the group consisting of zinc silicate and iron silicate, including the naturally occurring magnesium-iron silicate known as the mineral Olivine, as described in U.S. Pat. No. 3,446,668. An Olivine separator of this type can be prepared for example, by sintering at 1,200° C. a natural Olivine consisting essentially of 41.4 percent $SiO_2$, 49.3 percent MgO and 7.7 percent iron dioxide (FeO and $Fe_2O_3$) by weight, the remainder consisting essentially of trace amounts of CaO and $Cr_2O_3$.

Also, there can be employed the inorganic separator materials in the form of a sintered porous solid solution of an aluminum-bearing material such as aluminum oxide, and a substance selected from the group consisting of chromium, cobalt, nickel, magnesium, calcium and iron-bearing materials, e.g., a mixture of alumina and chromic oxide, as described in U.S. Pat. No. 3,446,669.

Still another form of inorganic separator material which can be employed according to the invention are porous sintered separators consisting essentially of a solid solution of a major portion of magnesium oxide and a minor proportion of an oxide such as zirconium dioxide, chromic oxide, aluminum oxide, titanium dioxide, and certain other oxides as described in copending application Ser. No. 727,394, filed May 8, 1968 of Frank C. Arrance, et al.

Also, inorganic separator materials derived from natural chromite, termed ferrochromite, and containing oxides of iron, magnesium, aluminum and chromium and formed into a sintered solid solution, as described and claimed in copending application Ser. No. 727,678 of Frank C. Arrance, filed May 8, 1968, can be employed.

As further examples of inorganic separator materials which can be employed are sintered zirconia (zirconium dioxide) separators, e.g., calcia stabilized zirconia, and sintered alumina separators.

An exemplary form of alumina separator material is formed by compacting alumina (aluminum oxides), e.g., at pressures of about 5,000 to 10,000 p.s.i., into membranes, and sintering such membranes at temperatures ranging from about 300° C. to about 1,800° C.

As a further example, inorganic separator materials formed from chrome-iron and known as spinelloids and formed of $FeO-CrO_3$ and comprising 35 percent to 50 percent chromic oxide, together with some silica as magnesium silicates, can also be employed.

Additional inorganic materials which can be employed include silicates such as magnesium silicate (Fosterite), and the like.

Preferred inorganic separator materials are those selected from the group consisting of (a) a solid solution of magnesium silicate and iron silicate, including Olivine, (b) zirconia, (c) a solid solution of a major portion of magnesium oxide and a minor proportion of an oxide selected from the group consisting of zirconium dioxide, titanium dioxide, alumina and chromic oxide, (d) a solid solution of ferrochromite, (e) spinelloids and (f) alumina.

It will be understood that mixtures of the above materials can be employed.

The term "inorganic separator materials" or "sintered ceramic separator material" as employed herein is intended to denote any of the above-noted sintered inorganic separator materials.

Although not preferred, an organic separator can be employed in a battery according to the invention. Suitable inert organic materials or plastics having suitable porosity characteristics which can be employed include, for example, microporous plastics such a nylon, Dynel (vinylchloride-acrylonitrile copolymer), Teflon (polytetrafluoroethylene), cellophane, regenerated cellulose, sausage casing and the like. Although such organic separators can be employed, the strength, chemical inertness, temperature-resistance and electrode-support characteristics of the inorganic or ceramic separators are significantly superior.

Also, flexible substantially inorganic separators can be employed. For example, flexible separators as described in U.S. application Ser. No. 676,223, filed Oct. 18, 1967, of Frank C. Arrance, can be utilized in batteries according to the present invention, such flexible separators comprising a major portion of an inorganic or ceramic separator material of any of the types described above, such as Olivine, a minor portion of potassium titanate in short fiber form, and a minor portion of a cured organic polymer, e.g., polyphenylene oxide, said cured organic polymer bonding the particles of said inorganic material and the potassium titanate fibers together, and forming porous separator structure.

Additional examples of flexible substantially inorganic separators which can be employed are those described in U.S. application Ser. No. 676,224, filed Oct. 18, 1967, of C. Berger, et al., consisting essentially of a major portion of a porous inorganic material of any of the types described above, such as Olivine, and a minor portion of a water coagulable organic fluorocarbon polymer such as vinylidene fluoride polymer, said polymer bonding the particles of the inorganic material together and forming a flexible membrane.

The inorganic and organic separators as above described should be of suitable porosity such that the separator walls function to retain electrolyte, and permit transfer of electrolyte ions but prevent transfer of electrode ions. A porosity in the range of from about 5 percent to about 50 percent, and most desirably in the range of about 10 percent to about 30 percent, is possessed by such separators.

If desired, however, other types of inorganic or organic separators can be employed.

Where the porous metal matrix, e.g., as illustrated at 18 in FIG. 3 is formed of active electrode material such as zinc or silver, the pores of the matrix need not be filled with active electrode material, and the porous matrix with unfilled pores can then be employed per se as a zinc or silver electrode. Porous nickel, copper and cadmium matrices of the type illustrated at 18 in FIG. 3, produced according to the invention, can also be employed without filling the pores to provide electrodes for a high-rate battery.

The following are examples of practice of the invention.

EXAMPLE 1

A piece of polyurethane sponge having about 1/8 inch openings is cut to a 2 inch ×2 inch ×0.050 inch wafer shape.

The cut sponge is expanded by soaking in chloroform for 1 minute.

The expanded sponge is then dipped in a slurry of PPO dissolved in chloroform and containing a mixture of silver and silver oxide. The composition of the slurry is 6 percent silver, 20 percent silver oxide, 4 percent PPO and 16 percent chloroform.

The coated and expanded sponge is then dried using forced air at about 150° F. for 30 seconds.

The dried, coated sponge is then placed in an electrically heated furnace provided with air circulation and heated according to the following schedule.

| Time | Temperature |
| --- | --- |
| 0 | 25° C. |
| 1 hr. | 50° C. |
| 2 hrs. | 100° C. |
| 3 hrs. | 200° C. |
| 4 hrs. | 400° C. |
| 5 hrs. | 600° C. |
| 7 hrs. | 800° C. |
| 8 hrs. | 900° C. (shut off) |
| 24 hrs. (cooling) | 30° C. |

At temperature between 200° and 400° C. the sponge is decomposed and removed, and at temperature between 450° and 600° C., the PPO is decomposed and removed. Also, in the latter temperature range, sintering of the metal matrix commences, the matrix being well formed and well supported. In the temperature range 600° to —900° C. additional sintering occurs.

The resulting silver matrix is highly uniform in structure and essentially free from sagging, collapse or other distortions.

EXAMPLE 2

A metal matrix is formed by procedure essentially as described in example 1 above, except employing as the slurry a 50 percent silver—50 percent silver oxide powder in water to form a slurry of about 40 percent solids content, and in the absence of PPO.

The resulting sintered silver matrix exhibits distortion and sagging and has nonuniform pore sizes. Also, such matrix structure is observed to contain agglomerated silver beads.

Figure 6:
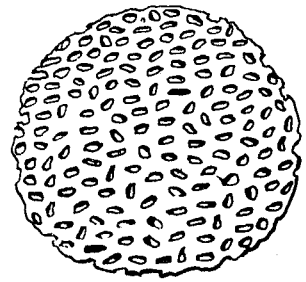
FIG. 6 is a photographic illustration of a porous matrix structure produced according to the invention process.
Figure 7:
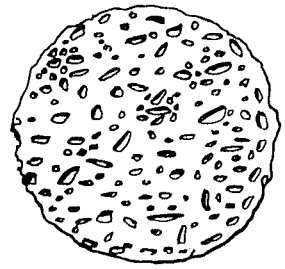
FIG. 7 is a photographic illustration of a porous matrix structure produced according to the prior art.

Thus, in FIG. 6 of the drawing is shown an illustration of the improved matrix structure produced according to example 1 above, and FIG. 7 illustrates the matrix structure obtained according to example 2 above. It will be seen that a matrix structure having more uniform pore size is obtained according to the procedure of example 1 as compared to the matrix produced in example 2.

EXAMPLE 2a

The procedure of example 1 is repeated except that when the temperature reaches 600° C. following decomposition and removal of the PPO, the heat is shut off and the matrix allowed to cool to 30° C. for the cooling time noted in example 1.

The resulting metal matrix is well formed and maintains its shape without sagging, but has somewhat less strength than the more completely sintered metal matrix produced according to example 1.

EXAMPLE 2b

The porous silver electrode matrix of example 1 is assembled in a battery with a conventional zinc electrode and a zirconia separator is placed between these electrodes, as illustrated in FIG. 5, employing a 30 percent KOH electrolyte solution.

The resulting silver-zinc battery exhibits efficient electrical performance as a secondary battery over a large number of charge-discharge cycles without any indication of distortion or slumping of the porous silver electrode.

EXAMPLE 3

A polyurethane sponge is dipped in a chloroform—PPO—silver powder slurry. The slurry consists of 22 percent PPO, 28 percent silver powder, 50 percent chloroform. The sponge swells as a result of contact with the solvent, and the cell structure of the sponge increases in size allowing the slurry to easily coat all exposed surfaces of the sponge. The dipped sponge is allowed to dry under a warm stream of air at about 200° F. for about one minute. The dipping-drying operation is repeated to a total of 3 dips. The coated matrix is finally dried at about 200° F. for about 3 minutes. After drying, the sponge is heated 8 hours with a temperature rise of about 100° C. per hour. During this heating period, the sponge decomposes, and is removed at about 350° C. and the PPO burns off and is removed at about 500° C. at which time complete sintering has occurred, and the furnace is shut off. The silver matrix is allowed to cool in the furnace for about 20 hours.

The strong porous matrix thus formed is then fabricated into a zinc electrode by placing the matrix in a steel die and filling the die cavity with a 98 percent zinc oxide—2 percent mercuric oxide electrode mix (dry powder). The electrode is formed by pressing the zinc powder into the pores of the silver matrix at about 15,000 pounds platen plate pressure, and the resulting zinc electrode is composed of a silver matrix or support, also functioning as a current collector, containing active zinc electrode material in the pores of the matrix.

The zinc electrode thus formed is then assembled into a test cell or battery using two conventional silver electrodes and an Olivine (solid solution of magnesium silicate and iron silicate) separator. Using 30 percent KOH as electrolyte the cell is then charged and discharged several times to determine its capacity and voltage performance. This cell yields 2.7 A.-hrs. (ampere hours) at 1.50 volts, as compared to standard electrodes of the same size which give 2.2 A.-hrs. at about 1.45 volts. No indication of collapse or distortion of the zinc electrode is observed after a substantial number of charge-discharge cycles.

EXAMPLE 4

Example 3 is repeated except that the zinc electrode is formed by placing a zinc paste formed of a mixture of 92 percent zinc oxide and 8 percent mercuric oxide, in 30 percent potassium hydroxide as a vehicle on the sintered silver matrix, and vibrating the paste into the pores of the matrix. A battery provided with such zinc electrode produces results similar to those of example 3.

EXAMPLE 5

A silver—PPO—chloroform slurry consisting of 40 percent chloroform, 30 percent PPO and 30 percent silver powder is prepared by mechanical stirring. A polystrene sponge is dipped into the slurry five times, the coated sponge being dried after each dip, as described in example 3. The resulting coated sponge is then placed in a furnace and sintered to a final temperature of 870° C., using 100° C. temperature rise increments over a period of 8 hours. The resulting matrix structure is allowed to cool overnight inside the furnace.

The sintered metal matrix thus produced is placed in a steel die cavity. Silver powder is added to the die cavity and pressed to about 8,000 pounds platen pressure into the pores of the matrix. The electrode thus formed is sintered after compaction for 15 minutes at 650° C. The resulting electrode is then assembled into a test cell using a zinc oxide counter electrode and an inorganic separator consisting essentially of a solid solution of magnesium silicate and iron silicate. thirty percent KOH is used as the electrolyte. This cell is cycled over 75 times at 100° C. on a ½-hour discharge—1-hour charge regime at 20 percent depth of discharge without any indication of collapse or distortion of the silver electrode.

EXAMPLE 6

The procedure in example 3 is followed except that the pores of the sintered silver matrix are filled with cadmium oxide by compression to form a cadmium electrode. The resulting electrode is assembled into a battery using two silver electrodes as the counter electrodes, and employing as inorganic separator between the silver and cadmium electrodes a sintered Olivine (solid solution of magnesium silicate and iron silicate) separator. This battery cycled 1,026 times at 20 percent depth of discharge at 25° C. on a ½-hour discharge—1½-hour charge cycle regime, without indication of collapse or distortion of the cadmium electrode.

EXAMPLE 7

The procedure in example 3 is followed except that nickel powder is used in the coating slurry in place of the silver powder. The slurry consists of 15 percent PPO, 50 percent nickel powder and 35 percent chloroform. The coated polyurethane sponge is heated and sintered by raising the temperature to 1,250° C. gradually over a 2 4-hour period, the sponge and the PPo coating being removed at different temperature levels as noted above, during such heating. After cooling overnight, the sintered nickel matrix is placed in a steel die and the pores of the nickel matrix are filled with cadmium oxide by pressing to 10,000 pounds platen pressure. The cadmium electrode formed is then assembled into a battery using a conventional nickel counter electrode. The separator used is a zirconia based flexible essentially inorganic separator used is separator comprised of 76 percent zirconia, 4 percent potassium titanate, 10 percent PPO and 10 percent polypropylene polyazelate, and employing 30 percent KOH electrolyte.

The battery is cycled for 250 cycles on a ½-hour charge—½-hour discharge cycle regime at 35 percent depth of discharge at 25° C. without indication of any collapse or slumping of the cadmium electrode. Using conventional cadmium electrodes in a similar battery shows lower electrical performance after less than 100 cycles of operation.

EXAMPLE 8

The silver matrix produced as described in example 1 is impregnated with a zinc oxide electrode mix (dry powder) as described in example 3 above, to produce a zinc electrode.

The resulting zinc electrode is then assembled in a battery with a conventional silver electrode and a flexible substantially inorganic separator formed of a flexible fuel cell asbestos carrier initially impregnated with PPO and then coated with a flexible film containing essentially a major proportion of a solid solution of magnesium silicate and iron silicate (Olivine) and small amounts of potassium titanate and PPO. A 40 percent KOH solution is used as electrolyte.

The battery is charged and discharged a number of times, providing 1.50 volts during discharge.

From the foregoing, it is seen that the invention provides procedure for producing improved sintered metal matrices of high strength and uniformity and free from sagging or slumping, permitting their use directly as an electrode in a high energy density battery, or as a matrix for introducing active electrode materials, the resulting matrix filled with such active electrode materials then being employed as battery electrodes. The improved electrodes according to the invention are particularly designed for use in high-rate batteries having high capacity, over an extended period of operation.

While we have described particular embodiments of our invention for purposes of illustration, it will be understood that various modifications and adaptations thereof may be made within the spirit of the invention, and the invention is not to be taken as limited except by the scope of the appended claims.

We claim:

1. A process which comprises contacting a spongelike organic material with a slurry containing a conductive sinterable inorganic material including a metallic constituent and a plastic binder which decomposes at a temperature higher than said spongelike material, said plastic binder being dissolved in a solvent, heating the so-treated spongelike material gradually up to a temperature ranging from about 200° to about 400° C., causing decomposition and removal of said spongelike material and removing same, the plastic binder continuing to maintain the remaining matrix relatively rigid, and further heating the remaining matrix formed of said plastic binder and inorganic material to a higher temperature above 400° C. and which is in the range of about 400° to about 600° C., causing initial sintering of said sinterable inorganic material and decomposition and removal of said plastic binder, and further heating and sintering the remaining initially sintered inorganic matrix up to a temperature of between about 750° and about 950° C. to provide a strong porous matrix of said inorganic material, said plastic binder being substantially stable during said initial sintering, and supporting said sinterable inorganic material, the resulting initially sintered inorganic matrix being substantially self-supporting when said plastic binder is decomposed and removed, the further heated and sintered matrix being uniform and substantially free from slumping.

2. A process as defined in claim 1, said metallic constituent comprising a sinterable metal selected from the group consisting of silver, copper, gold, nickel, iron, cadmium and zinc.

3. A process as defined in claim 1, said spongelike material being selected from the group consisting of polyurethane, polystyrene, natural sponge, neoprene, natural rubber and cellulose, said plastic binder being selected from the group consisting of polyphenylene oxide, polysulfone, acrylate polymers and butadiene-styrene polymers.

4. A process as defined in claim 1, said metallic constituent comprising a sinterable metal selected from the group consisting of silver, copper, gold, nickel, iron, cadmium and zinc, said spongelike material being selected from the group consisting of polyurethane, polystyrene, natural sponge, neoprene, natural rubber and cellulose, and said plastic binder being selected from the group consisting of polyphenylene oxide, polysulfone, acrylate polymers and butadiene-styrene polymers.

5. A process as defined in claim 1, said sinterable inorganic material consisting essentially of a mixture of silver and silver oxide, said spongelike material being polyurethane and said plastic binder being polyphenylene oxide.

6. A process as defined in claim 1, said slurry containing about 90 to about 10 percent of said solvent, and about 10 to about 90 percent solids, said solids consisting essentially of about 2 —to about 50 percent of said plastic binder, and about 50 to about 98 percent of sinterable inorganic material, including forming a coating of said slurry on said spongelike material, and drying the resulting coated spongelike material at temperature in the range of about 100° to about 200° F.

7. A process as defined in claim 1, said slurry containing about 90 to about 10 percent chloroform as solvent, and about 10 to about 90 percent solids, said solids consisting essentially of about 2 to about 50 percent dissolved polyphenylene oxide and about 50 to about 98 percent of a mixture of silver and silver oxide, including forming a coating of said slurry on said spongelike material, and drying the resulting coated spongelike material at temperature in the range of about 100° to about 200° F.

8. A process as defined in claim 6, including filling the pores of the resulting sintered porous matrix of said inorganic material with active electrode material selected from the group consisting of silver, zinc, cadmium and nickel.

* * * * *